United States Patent [19]

Hinze et al.

[11] 4,402,767

[45] Sep. 6, 1983

[54] FABRICATION OF ALLOYS

[75] Inventors: Jay W. Hinze, Newark, Ohio; Mark L. Robinson, Warwick, N.Y.; Richard D. Lawson, Newark, Ohio

[73] Assignee: Owens-Corning Fiberglas Corporation, Toledo, Ohio

[21] Appl. No.: 453,632

[22] Filed: Dec. 27, 1982

[51] Int. Cl.³ ............................................... C21D 8/00
[52] U.S. Cl. ................................................ 148/11.5 P
[58] Field of Search ......................... 148/11.5 P, 12 R

[56] References Cited

U.S. PATENT DOCUMENTS

| | | | |
|---|---|---|---|
| 3,749,612 | 7/1973 | Benjamin et al. | 148/11.5 P |
| 3,844,847 | 10/1974 | Bomford et al. | 148/11.5 P |
| 3,850,702 | 11/1974 | Buchanan | 148/11.5 P |
| 3,975,219 | 8/1976 | Allen et al. | 148/11.5 P |
| 4,073,648 | 2/1978 | Volin et al. | 148/11.5 P |
| 4,274,852 | 6/1981 | McGarry | 148/11.5 P |

Primary Examiner—W. Stallard
Attorney, Agent, or Firm—Ronald C. Hudgens; Patrick P. Pacella

[57] ABSTRACT

A process for producing an article of glass manufacture is disclosed in which oxide dispersion strengthened alloys are used to produce complicated shapes. The process includes a critical thermomechanical processing sequence to recrystallize the alloy into a coarse grain structure for high temperature service.

13 Claims, 6 Drawing Figures

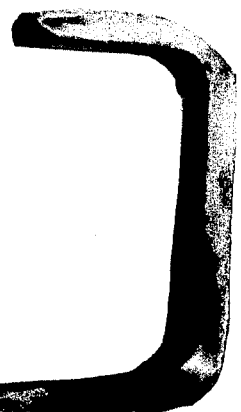
FIG. 5a  ⊢10mm⊣
FIG. 5b  ⊢100μm⊣
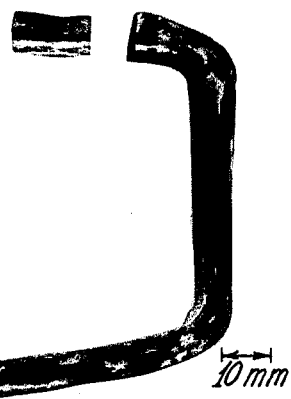
FIG. 6a  ⊢10mm⊣
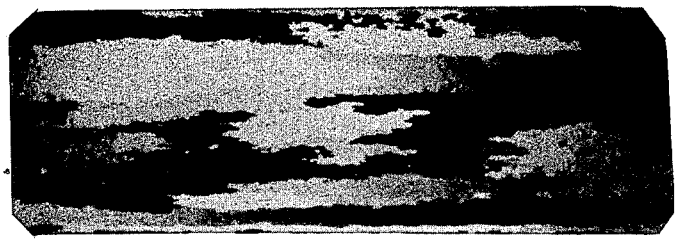
FIG. 6b  ⊢2mm⊣

FABRICATION OF ALLOYS

TECHNICAL FIELD

This invention relates to a process for producing an article of manufacture for glass making from an oxide dispersion strengthened alloy.

BACKGROUND ART

In certain industrial applications, there is a need for alloys which possess high rupture strength and high oxidation resistance at high temperatures. Among such applications are those involved, for example, in the glass fiber industry, where filaments are produced by passing a molten material, for example glass, through the foraminous walls of a chamber adapted for rotation at high speeds, the chamber being known as a spinner, the filaments being emitted through the apertures of the wall due to the centrifugal action to which the molten material is subjected upon rotation of the spinner. Such spinners are usually operated when spinning glass fibers at temperatures of about 1121° C. (2050° F.) and rotational speeds of 2,100 RPM.

Structural components such as those at elevated temperatures under constant loads experience continuous dimensional changes or creep during their lives. This creep behavior depends upon the interaction between the external conditions (load, temperature) and the microstructure of the component. In recent times, increased resistance to creep of material systems has been accomplished by using a dispersion of very small, hard particles (called dispersoids) to strengthen the microstructure of the component. Further improvements in strength are obtained through controlled thermomechanical processing to develop a coarse grain structure. Such a structure is required to prevent grain boundary sliding during high temperature service. In the case of a spinner for fiberizing molten glass, biaxial loading is experienced, and a coarse pancake grain structure is required. These systems have come to be known as dispersion-strengthened metals and alloys, and the dispersoids used are usually oxides.

A recent development in dispersion-strengthening has resulted from a process known as mechanical alloying. Generally, the process uses a high energy ball mill to achieve the intimate mechanical mixing typical of the process. An attritor mill or vibratory mill also can be used. The desired coarse grain structure in wrought products is obtained through a series of thermomechanical processing steps such as extrusion, hot rolling, forging, and hot spin forming followed by heat treating.

DISCLOSURE OF THE INVENTION

We have developed a process for producing articles of manufacture from these oxide dispersion strengthened alloys. Our invention is not merely one of producing dispersion strengthened alloys in the form of sheet or bar stock. Rather, our invention is one of producing shapes from these oxide dispersion strengthened alloys which are especially useful in the glass making industry. Our process uses a unique thermomechanical processing sequence which includes hot rolling and heat treating to recrystallize the alloy grain structure. This step is employed in combination with the step of hot spin forming the desired shape of the article. This process produces dispersion strengthened alloy spinners. The spinner relies upon a unique grain structure and an oxide dispersion intimately mixed into the alloy for its strength. The spinner has excellent resistance against molten glass attack and is capable of producing glass fibers and mineral wool at 1315° C. (2400° F.).

BRIEF DESCRIPTION OF THE DRAWINGS

FIGS. 3 to 6 are photographs showing the microstructure produced in spinners by different thermomechanical processing routes.

BEST MODE OF CARRYING OUT INVENTION

Methods are known for producing dispersion strengthened alloys by a technique utilizing high energy milling such as mechanical alloying. This technique is described in a series of patents commonly referred to as the "Benjamin" patents. These include U.S. Pat. No. 3,591,362 and U.S. Pat. No. 3,738,817, both of which are assigned to International Nickel Company. Mechanical alloying is a process for producing a wrought composite metal powder by mixing powders of the primary alloy ingredients with extremely finely divided powders of the dispersoid phase, typically a refractory oxide, and then milling the two powders together in a mill containing impact balls or the like. The dispersoid phase is literally hammered into the basic metallic phase and is distributed therein on a statistical basis, so that the resultant composite powder contains the refractory oxides impact welded into the metallic phase.

Materials formed by hot consolidation of this powder are used to make a variety of alloys. The powders are consolidated by canning them in containers and extruding at elevated temperatures. The consolidated powders now are in the form of a wrought bar. These bars are further processed by hot rolling and annealing to generate dispersion strengthened alloys.

The performance of dispersion strengthened alloys is very process sensitive. These alloys have only been made available in simple shapes such as bar stock for gas turbine vanes or sheet for gas turbine combustors. High temperature spinners having acceptable microstructures and properties have not been fabricated before from oxide dispersion strengthened alloys.

In order to obtain the desired rupture properties in a spinner, extruded bar stock is processed according to this invention to develop coarse, pancake-shaped grains in the final spinner shape to resist grain boundary sliding under the high centrifugal load. Such a grain structure has not, heretofore, been developed in parts more complex than sheet or bar stock. Neither a fine equiaxed grain structure nor a coarse rod-shaped grain structure is acceptable. Both will give poor performance causing the spinners to fail catastrophically under centrifugal loading.

In order to produce a dispersion strengthened spinner, following the hot rolling, the product is hot cross rolled into a plate of desired thickness. The resultant plate then is hot spin formed to the final shape of a spinner. In hot spinning, a roller forces the plate to take the shape of a spinning mandrel. Generally, the mandrel is rotating at approximately 250 rpms, and the operation is carried out at temperatures ranging from 538° to 1205° C. (1000° to 2200° F.). The initial spinner takes the shape of a bowl having no top flange. Then the top flange is hot spun formed by using a split mandrel. This mandrel is then removed following hot spin forming.

Figure 1:
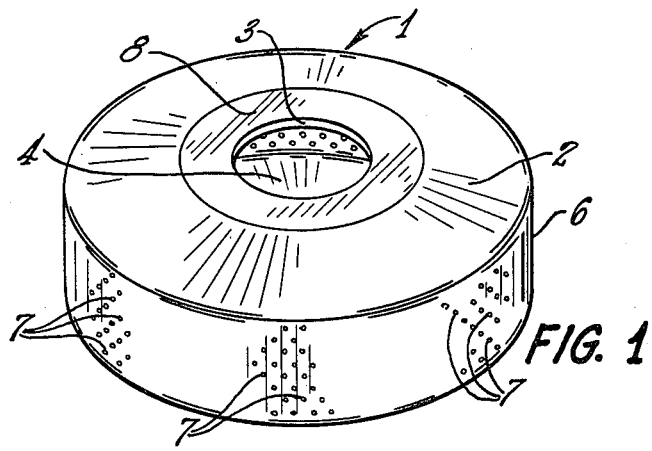
FIG. 1 is a perspective view of a spinner produced according to this invention.

Referring now to FIG. 1, there is a shown spinner 1 fabricated in its entirety of the alloy of this invention. Spinner 1 is comprised of a bottom flange 2 having opening 3 therein and top flange 4. Continuous periphery sidewall 6 extends between bottom flange 2 and top flange 4 to form a substantially cylindrical chamber. Sidewall 6 is adapted with apertures 7 which penetrate the sidewall and through which molten glass, introduced into the spinner through opening 8, is discharged.

Figure 2A:
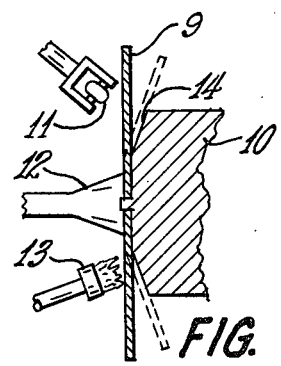
FIG. 2 is a schematic view of the hot spinning or forming according to this invention.
Figure 2B:
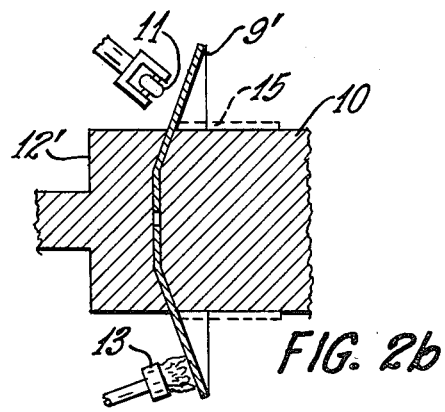
Figure 2C:
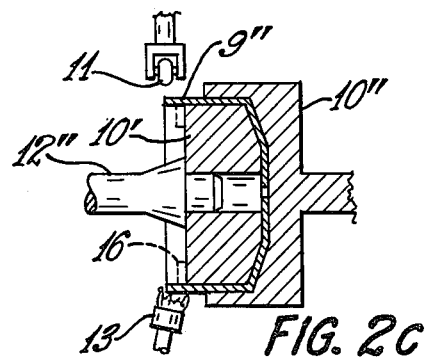

FIG. 2 shows the tooling for hot forming spinner 1. Workplate 9 is forced against mandrel 10 by roller 11. Tail stock 12 holds workplate 9 in place while torch 13 heats workplate 9 to spin forming temperature. Bottom flange 14 is formed against mandrel 10. Side wall 15 is formed with mandrel 10 and tailstock 12'. Top flange 16 is formed with split mandrel 10', mandrel 10'' and tailstock 12''.

The alloys employed in this invention may vary widely. Alloys of aluminum, nickel, copper, iron, and zinc base metals, columbium base, tantalum base, molybdenum base and tungsten base refractory metals, as well as platinum base and gold base metal, may be used.

The alloys used in this invention generally include a dispersoid of a metal oxide, metal carbide, metal silicide, metal nitride, metal sulfide or a metal boride which dispersoid is present in effective dispersion strengthening amounts. Usually, such amounts will be between about 0.1 percent to about 5.0 percent by volume. Preferably, the dispersoid will be an oxide.

One of the preferred alloys of the present invention is a ferritic alloy which consists essentially of, by weight, about 13 percent to about 35 percent chromium, about 0.2 percent to less than about 2 percent titanium, about 2 percent to about 7 percent aluminum, and a small but effective amount for sufficient high temperature strength up to less than about 2 percent yttria, and the balance, apart from incidental elements and impurities, essentially iron. Another preferred alloy is a dispersion strengthened austenitic alloy which consists essentially of, by weight, approximately 16 percent to 35 percent chromium, 0.0 to 1.0 percent carbon, 0.0 to 5.0 percent aluminum, 0.0 to 2.0 percent titanium, 0.4 to 2.0 percent yttria, and the balance, apart from incidental elements and impurities, is made up of nickel.

The plates are either given a unique high temperature recrystallization anneal prior to spinner forming, or else they are left in the unrecrystallized form, hot spin formed into the shape of the spinner, and then given the recrystallization anneal. The recrystallization anneal to develop the desired coarse pancake grain structures generally is carried out at a temperature above the alloys recrystallization temperature and below its melting temperature. Generally, this temperature ranges from about 1093° to 1648° C. (2000° to 3000° F.) for a time ranging from about 1 to 8 hours. For the alloy plates used in the following examples, the temperature ranged from about 1260° to 1482° C. (2300° to 2700° F.) for a time ranging from 1 to 6 hours.

EXAMPLE I

Plate of the oxide dispersion strengthened alloy known as INCOLOY* alloy MA 956 was obtained from Wiggin Alloys Limited, Holmer Road, Hereford HR4 9SL, England. This alloy is characterized by its chemical composition, as given in Table I, below. It exhibits a ferritic crystal structure, i.e., body centered cubic with a lattice parameter at room temperature of 0.290 nm, at all temperatures below its melting point, 1480° C. (2700° F.). The alloy exhibits a room temperature density of 7.2 Mg/M$^3$ (0.26 lb/in$^3$). The plate was obtained with appropriate dimensions, width, length and thickness, so that hot spinning blanks could be directly machined from it. The grain structure of the as-received plate was of a fine, submicron size, capable of being recrystallized to a coarse-pancake grain morphology upon high temperature annealing treatments.

TABLE I

COMPOSITION OF ALLOY OF EXAMPLE I

| Element | Composition Weight Percent |
|---|---|
| Iron | Balance |
| Chromium | 20 |
| Aluminum | 4.5 |
| Titanium | 0.5 |
| Yttrium Oxide | 0.5 |

The plates were either given a unique high temperature recrystallization anneal prior to spinner forming, or else they were left in the unrecrystallized form and then hot spin formed into the shape of the spinner. Disks of as-rolled (fine grained) alloy were hot spin formed in the temperature range 649° to 760° C. (1200°–1400° F.) using the three-stage process described in FIG. 2. First, a bevel was formed on the bottom of the blank. Next, the disk was formed up the sides of the mandrel to make an open bowl shape. Last, a split mandrel was placed inside the bowl, and the re-entrant upper flange was formed. The mandrel was then disassembled and removed from the finished part. During each step, the appropriate area of the workpiece was heated to the desired temperature by an oxygen-propane torch. The as-formed spinners were then given a four hour recrystallization anneal at 1427° C. (2600° F.) to develop the desired coarse pancake grain structures. Alternatively, disks of unrecrystallized alloy were given a two hour recrystallization anneal at 1399° C. (2550° F.) prior to hot spin forming. Hot spin forming was then done in the temperature range 927° to 982° C. (1700°–1800° F.). Pertinent hot spin forming parameters used in both cases are given in Table II.

TABLE II

| HOT SPIN FORMING PARAMETERS | |
|---|---|
| Temperature | 927 to 982° C. (1700 to 1800° F.) or 649 to 760° C. (1200 to 1400° F.) |
| Speed | 250 RPM |
| Roller | 38 mm (1.5 inch) radius; manually actuated with hydraulic assist |
| Heat-Up | Oxygen-propane torch; ambient to spinning temperature in less than 3 minutes |
| Blank Size | 445 to 460 mm (17½ to 18 inches) O.D. 8 mm (5/16 inch) thick |

INDUSTRIAL APPLICABILITY

Figure 3A:
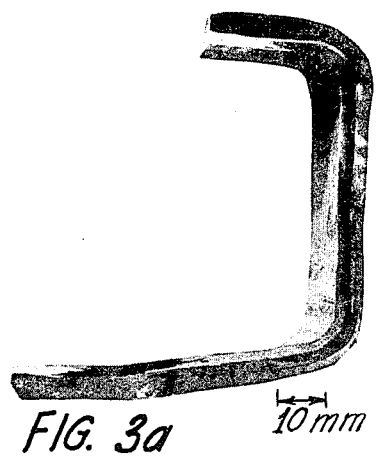
Figure 3B:
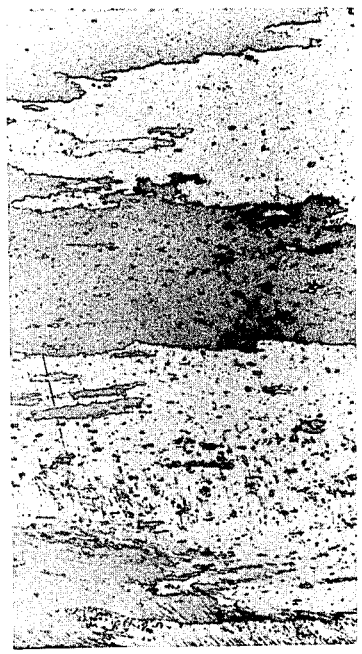
Figure 4A:
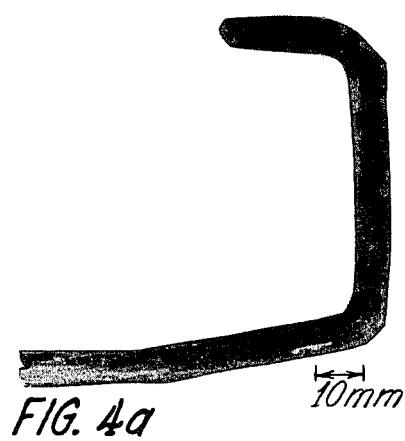
Figure 4B:

An example of the microstructure of spinners processed under the above conditions is shown in FIG. 3. An example of the structure of an inadequately thermomechanically processed spinner is shown in FIG. 4. Regions of coarse pancake-shaped grains coexist with fine grains. This duplex structure was found to give poor high temperature rupture strength. The as-received structure prior to heat treatment is shown in FIG. 5. A spinner section having this unrecrystallized grain structure had very poor stress rupture resistance. From FIGS. 3-5 it is apparent that the unique thermomechanical processing is critical to the development of the desired structure and acceptable high temperature rupture properties.

Sections of spinners processed in the above manner were submitted to high temperature rupture tests. Results are shown in Table III in which the rupture properties of spinner sections of alloys processed according to Example I were compared to spinner sections of an existing spinner alloy of composition shown in Table IV.

TABLE III

RUPTURE PROPERTIES OF ALLOY PROCESSED ACCORDING TO EXAMPLE I COMPARED TO EXISTING SPINNER ALLOY

| Material | Temperature °C. (°F.) | 100 Hr. Rupture Strength M Pa (Psi) |
|---|---|---|
| Existing Alloy | 1149 (2100) | 20.7 (3000) |
| Alloy of Example I | 1149 (2100) | 41.4 (6000)* |
| Existing Alloy | 1304 (2350) | Above melting point (zero) |
| Alloy of Example I | 1304 (2350) | 20.7 (3000*) |

*Long Transverse Orientation

From the table it is clear that the spinners which are processed according to Example I exhibit a 121° C. (250° F.) temperature advantage over the existing spinner alloy.

TABLE IV

COMPOSITION OF EXISTING SPINNER ALLOY DESCRIBED IN U.S. PAT. NO. 3,933,484

| Element | Approximate Weight Percent |
|---|---|
| Chromium | 31.2 |
| Nickel | 10.4 |
| Tungsten | 6.5 |
| Tantalum | 2.8 |
| Iron | 0.32 |
| Zirconium | 0.01 |
| Silicon | 0.38 |
| Carbon | 0.58 |
| Boron | 0.03 |
| Cobalt | Balance |

EXAMPLE II

The oxide dispersion strengthened alloy known as INCONEL* alloy MA 754 was obtained from Huntington Alloys, Inc., Huntington, WV 25720, USA. This alloy is characterized by its chemical composition as given in Table V, below. It exhibits an austenitic crystal structure, i.e., face centered cubic with a lattice parameter at room temperature of 0.335 nm, at all temperatures below the melting point, 1400° C. (2550° F.). The alloy has a room temperature density of 8.3 Mg/M$^3$ (0.30 lb/in). The grain structure of the hot spinning blanks prepared from this material was of a fine, submicron size, capable of being recrystallized to a coarse-pancake grain morphology upon high temperature annealing treatments.

TABLE V

COMPOSITION OF ALLOY OF EXAMPLE II

| Element | Composition Weight Percent |
|---|---|
| Nickel | Balance |
| Chromium | 20.0 |
| Carbon | 0.05 |
| Aluminum | 0.3 |
| Titanium | 0.5 |

TABLE V-continued

COMPOSITION OF ALLOY OF EXAMPLE II

| Element | Composition Weight Percent |
|---|---|
| Yttrium Oxide | 0.6 |
| Iron | 1.0 |

The three spin forming operations were conducted in the temperature range 927° to 1038° C. (1700°–1900° F.). The as-formed spinners were given a 1.0 to 3.0 hour recrystallization anneal at 1316° C. (2400° F.) to develop the coarse pancake grain structure. An example of the macrostructure of spinners produced under the above conditions is shown in FIG. 6. Sections of spinners processed in the above manner were submitted to high temperature rupture tests. Results are shown in Table VI in which the rupture properties of alloy processed according to Example II were compared to those of an existing spinner alloy.

TABLE VI

RUPTURE PROPERTIES OF ALLOY PROCESSED ACCORDING TO EXAMPLE II COMPARED WITH EXISTING SPINNER ALLOY

| Material | Temperature °C. (°F.) | 100 Hr. Rupture Strength M Pa (Psi) |
|---|---|---|
| Existing Alloy | 1149 (2100) | 20.7 (3000) |
| Alloy of Example II | 1149 (2100) | 82.7 (12000*) |
| Existing Alloy | 1304 (2350) | Above Melting Point |
| Alloy of Example II | 1304 (2350) | 27.6 (4000) |

*Long Transverse Orientation

As with the case of spinners processed according to Example I, those processed according to Example II exhibit at least at 121° C. (250° F.) temperature advantage over the existing spinner alloy. It was found that the alloy described in Example II could not be hot spin formed in the recrystallized, coarse grain condition. Disks of recrystallized material exhibited very poor formability and cracked severely during the hot spin forming process.

"*INCOLOY, INCONEL are trademarks of the Inco family of companies."

We claim:

1. A process for producing an article of manufacture for glass making from a mechanically alloyed or oxide dispersion strengthened alloy including the steps of:
   warm working the alloy at temperatures below its recrystallization temperature;
   annealing the warm worked article to recrystallize the alloy to a coarse grain structure; and
   hot forming the article of manufacture for glass making.

2. A process for producing an article of manufacture for glass making from a mechanically alloyed or oxide dispersion strengthened alloy including the steps of:
   warm working the alloy at temperatures below which substantial recrystallization occurs;
   hot forming the article of manufacture for glass making; and
   annealing the hot formed article to effect recrystallization of the alloy to a coarse grain structure.

3. A process according to claims 1 or 2 wherein the annealing is carried out at temperatures above which substantial secondary recrystallization or grain growth occurs.

4. A process for producing spinners for forming glass fibers from a mechanically alloyed or oxide dispersion strengthened alloy including the steps of:
- warm working the bar stock of the alloy at temperatures below which substantial recrystallization occurs to form a plate;
- annealing the warm worked plate above this temperature to effect recrystallization to a coarse grain structure; and
- hot spinning the annealed plate to the shape of a spinner.

5. A process according to claim 4 including the additional step of heat treating the spinner to develop a desired grain structure.

6. A process for producing spinners for forming glass fibers from a mechanically alloyed or oxide dispersion strengthened alloy including the steps of:
- warm working bar stock of the alloy at temperatures below which substantial recrystallization occurs to form a plate;
- hot spinning the warm worked plate to the shape of a spinner; and
- annealing the spinner above the alloy's recrystallization temperature to effect a coarse grain structure.

7. A process according to claim 4 or 6 wherein the alloy is an iron or nickel-based oxide dispersion strengthened alloy.

8. A process according to claim 4 or 6 wherein the step of hot spinning is carried out at a temperature ranging from about 538° to 1205° C. (1000° to 2200° F.).

9. A process according to claim 4 or 6 wherein the step of hot spinning is carried out at a temperature ranging from about 649° to 760° C. (1200° to 1400° F.).

10. A process according to claim 4 or 6 wherein the step of hot spinning is carried out at a temperature ranging from about 927° to 1038° C. (1700° to 1900° F.).

11. A process according to claim 4 or 6 wherein the step of annealing is carried out at a temperature below the melting point of the alloy.

12. A process according to claim 11 wherein the step of annealing is carried out at a temperature ranging from about 1093° to 1649° C. (2000° to 3000° F.) for a time ranging from 1 to 8 hours.

13. A process according to claim 11 wherein the step of annealing is carried out at a temperature ranging from about 1260° to 1482° C. (2300° to 2700° F.) for a time ranging from about 1 to 6 hours.

* * * * *